(No Model.)
W. BAUR & J. V. V. BOORAEM.
TRAY FOR PICKING UP AND HANDLING CUT SUGAR.
No. 349,028.          Patented Sept. 14, 1886.
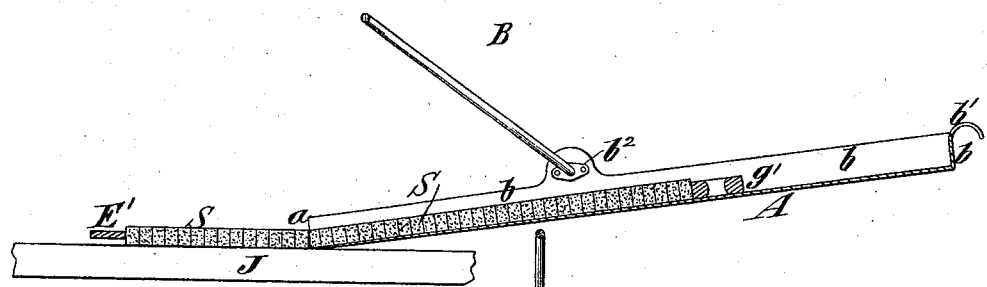
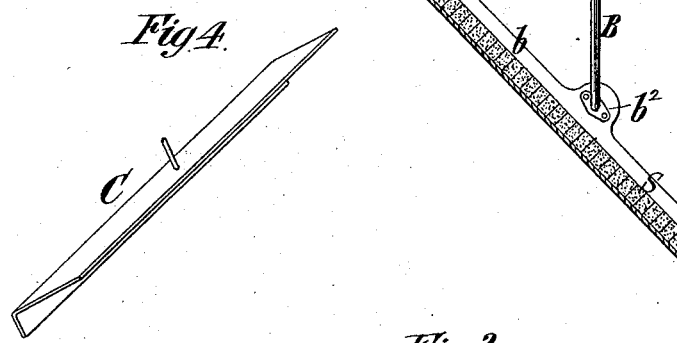
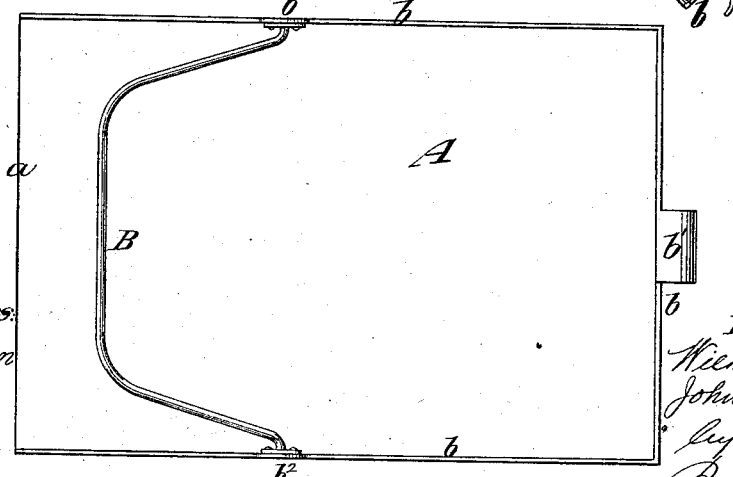

United States Patent Office.

WILHELM BAUR AND JOHN V. V. BOORAEM, OF BROOKLYN, NEW YORK.

TRAY FOR PICKING UP AND HANDLING CUT SUGAR.

SPECIFICATION forming part of Letters Patent No. 349,028, dated September 14, 1886.

Application filed January 18, 1886. Serial No. 188,829. (No model.)

*To all whom it may concern:*

Be it known that we, WILHELM BAUR and JOHN V. V. BOORAEM, both of the city of Brooklyn, in the county of Kings and State of New York, have invented a new and useful Improvement in Trays for Picking Up and Handling Cut Sugar, of which the following is a specification.

The improved tray which forms the subject of our invention may be employed in handling sugar cut in various shapes or forms when arranged in layers; but it is particularly intended for picking up and removing tablet or domino sugar from the machine which forms the subject of our application for United States Letters Patent, Serial No. 188,828, filed January 18, 1886.

This tray consists, in its most approved form, of a flat plate having around the sides and back a raised or upwardly-projecting rim and left open at the front, and also having a handle at the back, and a bail riveted or otherwise secured to the tray at a point nearer the front than the back, so that after the tray has been filled and is held suspended by the bail it will assume an inclined position with its front uppermost and its back lowest, in which position the sugar will be naturally retained therein.

In the machine which forms the subject-matter of our application above referred to there is a movable weight placed in front of the sugar and carried along in advance of the sugar through the machine. When the sugar is picked up by the tray, this weight is or may be picked up also, and goes to the back of the tray. After the sugar has been picked up within the tray, we place on the front of the layer of sugar an L-shaped evener or weight, which overlaps the end and the end portion of the top of the layer and holds the sugar compactly in place in the tray.

In the accompanying drawings, Figure 1 represents a sectional view of our improved tray and a portion of the supporting-grate of the machine illustrated in our above-referred-to application, the tray being in the position which it occupies when picking up a layer of cut sugar from the machine. Fig. 2 represents the tray with a layer of sugar within it in the position which it assumes when carried by the bail alone. Fig. 3 is a plan of the tray, and Fig. 4 is a perspective view of the evening plate or weight which is applied at the front end of the layer of cut sugar.

Similar letters of reference designate corresponding parts in all the figures.

The tray A, which is of rectangular form, is open at the front, $a$, and has around the sides and back a raised or upwardly-projecting rim, $b$. It has, or may have, at the back a handle, $b'$, with which one hand may engage to handle the tray, and it also has a bail, B, which is riveted or otherwise fixed at $b^2$ to the sides of the tray. The points of attachment of the bail are preferably nearer the front than the back of the tray, so that when the tray has been filled and is picked up and carried by the bail B it will assume an inclined position, as shown in Fig. 2, with its back or closed end lowermost, and in which position the sugar S cannot drop out.

We have in Fig. 1 represented one of the cross-bars E', whereby the sugar is carried forward through the machine described in our above-referred-to application, and a portion of the grating J, over which the cut sugar is carried. In our said application we have described a weight, $g'$, as placed in front of the sugar and carried through the machine in advance of the sugar. When it is desired to pick up a layer of cut sugar from the machine, the front open end of the tray may be placed on the grating J, as shown in Fig. 1, and the tray then pushed forward under the layer, thereby picking up the weight $g'$ and the entire layer of cut sugar, or any portion thereof, and transferring the layer or portion unbroken and in regular order to the tray; but the tray may be placed in the position described and the layer of sugar carried onto it in regular order by the forward movement of the sugar. After the layer of sugar has been thus transferred to the tray, we place upon the front end of the layer an evening plate or weight, C, which is L-shaped in transverse section, and of a length to fit between the side rims $b$ of the tray. This evener or weight overlaps the front edge and adjacent top portion of the layer of cut sugar, and evens it and holds it in proper place. After the layer has thus been transferred to the tray, it may be lifted and carried wholly by the bail B, and will then hang in an inclined position, as shown in Fig. 2, and may be carried from place to place without disturbing the layer of sugar within it.

As here represented, the tray A is made of about one-half the width of the layer of sugar which is cut by our above-referred-to machine, and two trays may be placed side by side for picking up the entire layer of sugar. After being thus transferred to the tray, the layer of cut sugar may be disposed of in any suitable way; but we prefer to employ the tray for packing the layers of cut sugar in boxes, as shown and described in our application for United States Letters Patent, No. 188,830, filed January 18, 1886.

What we claim as our invention, and desire to secure by Letters Patent, is—

1. A tray for handling cut sugar, open at the front and having an upwardly-projecting rim at the back and sides, and having a handle at the back and a bail fixed to it between its ends, substantially as herein described.

2. The tray herein described, open at the front and having an upwardly-projecting rim, b, at the back and sides, and having a bail, B, fixed to it at a point nearer the front than the back, substantially as herein set forth.

3. The combination, with the tray herein described, open at the front and having an upwardly-projecting rim, b, at the back and sides, and also having a bail, B, fixed to it at a point nearer the front than the back, of a weight, g', adapted to fit between the sides of the tray and to be placed in the tray in advance of the sugar therein, substantially as herein set forth.

4. The combination, with the tray herein described, open at the front and having an upwardly-projecting rim at the back and sides, and a bail, B, fixed to it at a point nearer the front than the back, of the L-shaped weight and evener C, of a length to fit between the sides of the tray and adapted to overlap the top and front of a layer of cut sugar in the tray, substantially as herein set forth.

WILHELM BAUR.
J. V. V. BOORAEM.

Witnesses to the signature of Wilhelm Baur:
C. BORNGRAEBER,
GEORG BEUCHELT.

Witnesses to the signature of J. V. V. Booraem:
FREDK. HAYNES,
MINERT LINDEMAN.